March 15, 1932. W. E. GOLDSBOROUGH 1,849,324
AIR STORAGE FOR INTERNAL COMBUSTION ENGINES
Filed Sept. 10, 1927
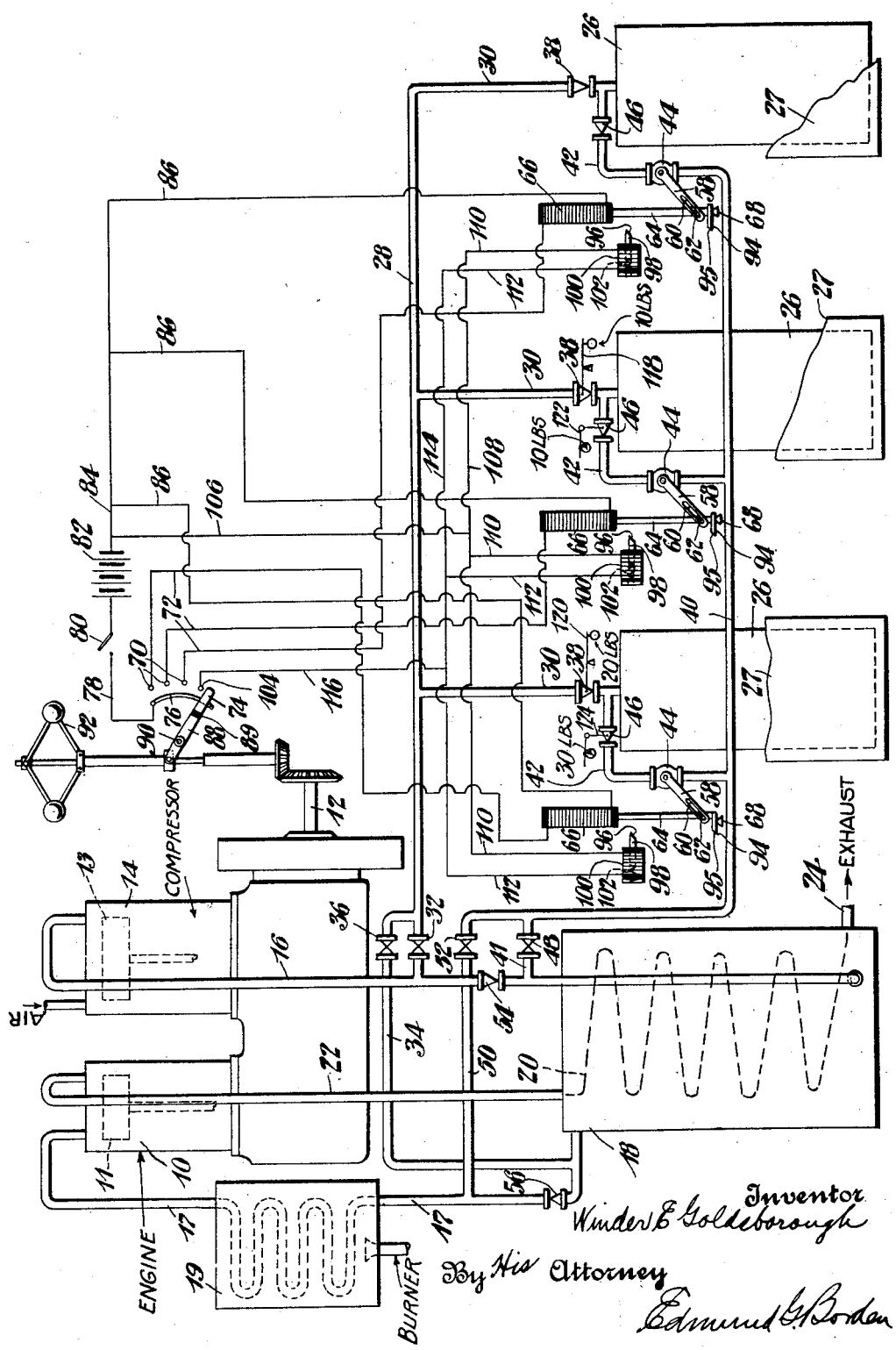
Inventor
Winder E. Goldsborough
By His Attorney
Edmund G. Borden Patented Mar. 15, 1932

1,849,324

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

AIR STORAGE FOR INTERNAL COMBUSTION ENGINES

Application filed September 10, 1927. Serial No. 218,780.

The present invention relates to prime movers and more particularly to internal combustion engines having an air compressor chamber separate from the combustion chamber.

It is well known to provide storage bottles or storage reservoirs for compressed air for use in starting internal combustion engines.

Moreover, it has been proposed to use a given receiver for storage air both for starting and for use under overload conditions. If however, an engine having a given air receiver is started a plurality of times in close succession, it has been necessary to start under reduced pressure after the first starting operation. Similarly if the engine has passed through a succession of overload conditions occurring close together, the second and subsequent overload conditions have found the receiver pressure materially depleted, the receiver thereby being rendered partially inoperative.

It is one of the principal objects of the present invention to provide reservoir means for a prime mover adapted to furnish air to start or to assist the prime mover a plurality of times without loss of maximum air pressure.

The second object of the present invention is to provide an improved arrangement for storing high pressure air during low load conditions on the prime mover and for returning it under overload conditions.

Another object of the present invention is to provide an improved automatic means for the maintenance of high pressure on the air storage receivers used for starting and for equalization of the load.

Another object of the present invention is to provide means for the storage of hot high pressure air for use in starting.

The novel features of the present invention are pointed out with particularity in the appended claims. The invention together with further objects and features, will be specifically defined in the following description taken in connection with the accompanying drawing, in which:—

The figure is an elevation, somewhat diagrammatic in character, of a prime mover and air storage apparatus therefor embodying the preferred form of the invention.

In the drawing, 10 is the combustion cylinder of an internal combustion engine. The cylinder 10 contains a piston 11 connected in the usual manner with a shaft 12. The shaft 12 is connected in the usual manner to a second piston 13 mounted to reciprocate in the air compressor cylinder of the chamber 14. Fuel is burned with air in the cylinder 10 to develop power by driving piston 11 and thereby to rotate shaft 12 from which power is taken off for useful purposes. In the arrangement illustrated the rotation of the shaft 12 operates the piston 13 in cylinder 14 to compress air in cylinder 14 which is utilized to support combustion in the cylinder 10.

Air is conducted from cylinder 14 to cylinder 10 by a connection including pipe sections 16, 17. Preferably also the connection between cylinder 14 and cylinder 10 includes a recuperator 18. The air for the support of combustion in cylinder 10 is heated within the casing 18 while passing therethrough by a coil 20 carrying the hot exhaust gases from cylinder 10 and delivered to the coil 20 by a pipe 22. After passing through coil 20, the hot gaseous products of combustion may be exhausted to atmosphere at the point 24. The arrangement just described for heating the air on its way from chamber 14 to cylinder or chamber 10 is only one of a number of suitable ways in which heating of the air may be accomplished.

According to the present invention, a plurality of storage bottles or receivers 26, 26 are connected to one or both of the pipe sections 16 and 17 so that, when the combustion cylinder 10 does not require the entire air output of the compression cylinder 14, air may be stored in the reservoirs or receivers 26. In the particular embodiment of the invention disclosed a pipe 28 is provided connected to each of the receivers 26 by pipes 30, 30. Pipe 28 is connected directly to the pipe section 16 through a hand valve 32. Pipe 28 also is connected to the pipe section 17 through a pipe 34 containing hand valve 36. If valve 36 is closed and valve 32 opened, cold air from pipe 16 may pass through pipes 28 and 30 and be stored in the receivers 26. If valve 32 is closed and valve 36 opened hot air from pipe section 17 may pass through pipes 34, 28 and 30 and be stored in the receivers 26. For the storage of the hot compressed air, reservoirs 26 are covered by or lined with heat insulating material 27.

If it is desired to use cold air in the receivers 26, then, while the engine is in operation, valve 32 should be kept open and valve 36 should be kept closed; whereas, if it is desired to use hot air in the receivers 26, valve 32 should be kept closed and valve 36 should be kept open. The open or closed relation of the valves as just stated is irrespective of the action of the governor in relation to valves 44. The recuperator 18 is designed to deliver air at a temperature well above 500° F., so that when hot air which has passed through recuperator 18 is stored in receivers 26, air for starting and for assisting the engines on heavy loads is delivered from receivers 26 usually at 500° F. or above, thereby greatly economizing in the air required to be delivered by the air compressor to receivers 26.

The engine having the cylinder 10 is not provided with any ignition means for use during the normal running of the engine, the air supplied by the recuperator 18 being at a temperature high enough to ignite the injected fuel. In starting the engine, small auxiliary ignition means (not shown) may be used, but if the air has been heated in recuperators before being stored in receivers 26, it will frequently be hot enough to ignite the fuel without the use of any auxiliary means. For this purpose of course it is possible to employ readily inflammable fuel at the time of starting the engine. In case the air in the receivers 26 is not at a high enough temperature to ignite the fuel in cylinders 10, when the engine is started, it is preferred to heat the air by a heater 19 in line 17 before introducing the air into cylinder 10.

In order that the receivers 26 may not operate merely as the equivalent of a single large receiver, check valves 38, 38, are placed in pipes 30 and so arranged that air may pass from pipe 30 into the receivers 26, but may not pass back into pipes 30 from the receivers. To take the air from the receivers 26 for use, in the arrangement illustrated, a pipe 40 is provided connected to the receivers 26 through branch pipes 42, 42. Each of the branch pipes 42 contains a valve 44, preferably of the rotary or turning plug type. Valves 44 are arranged for automatic operation and preferably also for manual operation. The arrangements for this purpose will be further described below. Pipes 42 also contain preferably check valves 46 so arranged as to prevent passage of air from pipe 40 through pipes 42 into the receivers 26, but to permit air to pass from receivers 26 through pipes 42 to pipe 40. Check valves 46 act to prevent one of receivers 26 from discharging partially into another receiver 26 which has been previously partially discharged. Pipe 40 is connected to deliver air to the pipe section 16 through the branch pipe 41 containing the hand valve 48. Pipe 40 may also deliver air from the reservoirs 26 to the pipe section 17 through the branch pipe 50 containing the hand valve 52. It will be seen that pipe section 16 is illustrated as containing a check valve 54, pipe 28 being connected to pipe section 16 on the intake side of check valve 54 and pipe 40 being connected to pipe section 16 through branch 41 on the outlet side of check valve 54. Moreover, pipe section 17 is illustrated as containing a check valve 56, the pipe 28 being connected to pipe section 17 through the branch 34 on the inlet side of the check valve 56 and the pipe 40 being connected to the section 17 through the branch 50 on the outlet side of the check valve 56. Check valves 54 and 56, while not essential to the present invention are preferably used to maintain the pressure from the receivers 26 at as high a value as possible when air is delivered to cylinder 10 by reducing to a minimum the amount of pipe section or other volume which must be filled with high pressure air from the receivers 26 at the times the receivers are discharged. In particular, check valve 56 prevents pressure air from the receivers 26 from passing back into the recuperator or heater 18. As the recuperator 18 has normally a considerable volume, check valve 56 prevents a material drop in pressure of air from the receiver delivered to the combustion chamber 10 for starting or low equalizing purposes.

The valves 44 in the discharge connections 42 leading from the receivers 26 are arranged preferably for either automatic or manual operation. In the arrangement as illustrated, valves 44 have levers 58 connected thereto for turning the rotary members of the valve. Preferably the levers 58 are operated electrically when in automatic operation. In the particular embodiment of the invention disclosed, the levers 58 are slotted at 60, 60, pins 62, 62 being provided which are fixed to rods 64, 64, and lie in slots 60. Rods 64 are illustrated as fixed to the movable cores of solenoids 66, 66. Solenoids 66 are arranged with their axes vertical whereby the rods and cores are normally held downward by gravity against stops 68, 68 and in such position that the pins 62 are near the outer ends of slots 60, thereby holding down the lever arms 58 and keeping the valves 44 in closed position. When the windings of solenoid 66 are energized, rods 64 are drawn upwardly thereby lifting pins 62 and turning the levers 58 upward in clockwise direction to open the valves and permit discharge of air from the receivers. The solenoids 66 should be energized one at a time so that first one and then another of the receivers 26 may be drawn into operation. Any suitable means may be employed for energizing the solenoids 66. In the arrangement illustrated, one end of the winding of each solenoid 66 is connected to one of the series of contacts 70, 70 by leads 72, 72.

The contacts 70 are arranged so that each may form part of a circuit including the windings of one of the solenoids 66, a movable contact 74, an arcuate fixed contact 76, a lead 78, a switch 80, a battery 82, a lead 84 and individual leads 86, 86 connecting lead 84 with the other sides of the windings of solenoids 66. The movable contact 74 is constantly in electrical contact with the arcuate contact 76 and is mounted at the end of a lever 88, but is insulated from lever 88 as indicated at 89. If the lever 88 swings on its pivot 90, the contact 74 at one end of lever 88 swings across and contacts with one contact 70 after the other thereby bringing first one solenoid 66 and then another into the circuit including battery 82 whereby the solenoid 66 in circuit is energized and the corresponding discharge valve 44 operated to permit discharge of compressed air in one of the reservoirs 26 into the common discharge pipe or line 40. Preferably, according to the present invention, the lever 88 is operated automatically from the governor 92 of the engine, and according to the particular embodiment of the invention illustrated herein governor 92 is geared to the engine shaft 12 and is of a known type. The connections between governor 92 and lever 88 are such that when the engine speed is slightly above that desired under full load conditions the movable contact 74 is held down beyond the lowermost one of the contacts 70 but when the speed of the governor drops to a certain predetermined point, the movable contact 74 is raised and will throw that one of the solenoids 66 into circuit which, in the arrangement illustrated, is connected to the lowermost contact 70. The valve 44 connected to be operated by the solenoid 66 in circuit will thereupon be moved into discharge position in an obvious manner. Similiarly, if the speed continues to fall, the other valves 44 will be operated one after the other as contact 74 moves to the corresponding fixed contacts 70 and will connect their corresponding reservoirs 26 with the line 40. If the speed of the engine picks up as soon as one reservoir has discharged, the pressure of the air delivered by compressor 14 will soon rise to the point of being equal to the pressure of the particular reservoir 26 which has been discharged and the flow of air from this reservoir will therefore automatically stop. Upon a slight further increase of speed in the engine, the air compressor will deliver sufficient air to recharge the partially discharged reservoir 26. It will be seen therefore that it may not be necessary that all the reservoirs take part in assisting the compressor to furnish air for combustion when the engine is carrying heavy load, provided of course the period of the overload is short. The reservoirs whose discharge valves have not been operated at the time of any given overload remain fully charged owing to the check valves 38 and are available for delivering maximum pressure to the engine in case another overload period occurs before the first reservoir has been fully recharged.

Furthermore, irrespective of the action of the governor 92, the lever 88, the solenoid 66 and valves 44 during the operation of the engine, either valve 32 or valve 36 being continuously open, the receivers 26 will be continuously under charge directly from the compressor 14 whenever the pressure in pipe 16 exceeds the pressure in the receivers.

It will be seen moreover, that the storage system according to the present invention is adapted to supply starting air to the engine at maximum pressure for a plurality of starts wherever the engine is started under conditions such that air has not been drawn from all the storage bottles on the first one or two starts or the load has been sufficiently light, so that one or more bottles may have been recharged during the running period between starts.

It will be seen that it is important to always have some high pressure compressed air in the storage system and it is desirable that the arrangement should provide for some high pressure compressed air being obtained in at least some quantity as easily and quickly as possible. For quickly obtaining some high pressure compressed air, it is preferred, according to the present invention, to use means for the successive or preferential charging of these storage chambers. In the arrangement illustrated, the check valves 38, and the connections 30 intermediate the common charging line and the storage bottles 26 are weighted so that they open to pass air into the storage bottles at different pressure differences on their two sides. It is desired that air reservoirs or bottles which discharge first should also be recharged first; the storage bottle which discharges second be charged after, or less readily, than the first; and that the storage bottle which discharges third should be recharged after, or less readily than, the bottle which discharges second. In order to carry out the method of operation just described, the check valve 38 for the reservoir 26 at the right as viewed in the drawing, is substantially unweighted and therefore passes air into its storage bottle at a minimum difference of pressure between that in the connection 36 and that in the right hand storage chamber. The check valve 38 between the central bottle 26 in the line and its connection 30, may be provided with means such as a spring or the like whereby air passes into the central bottle 26 only when the pressure in the line 30 is materially above that of the central bottle 26. In the drawing, the means for this purpose is indicated diagrammatically by a lever 118, at the end of which is a circle having an arrow leading therefrom and pointing to the caption "10 lbs." Similarly the check valve 38 associated with the left hand bottle 26 in the drawing is preferably arranged to pass gas from the connection 30 to the left hand bottle 26 only when the difference in pressure between the connection 30 and left hand bottle 26 is materially greater than that required to pass gas into the central bottle 26. The operation of the check valve 38 just described may be obtained conveniently by means of a spring or other suitable means and is indicated diagrammatically in the drawing by a lever 120 connected to the check valve 38 at one end and having a circle at its other end from which an arrow points to the caption "20 lbs." It will be understood that the preferential or successive filling of the receivers or bottles 26, which can obviously be obtained by the use of weighted check valves, as just described, is important for the reason that one receiver can be filled much quicker than can three receivers or so which are being filled at once. By the arrangement described, therefore, a material quantity of high pressure air can be obtained much more quickly than if check valves 38 were all operated by the same difference in pressure. To illustrate this, suppose we consider a condition in which the pressure in all three receivers has been lowered on account of the engine being under some sustained heavy load and that the load then falls off. With the building up of the pressure the receiver 26 at the right would first be filled even though the pressure in the other two receivers was still low. In the event that the receiver at the right is filled and that, before the other two receivers can be filled, another heavy load comes on, the receiver at the right will be filled with air of a pressure to meet the emergency (at least in a measure) and overcome the overload in case it is not sustained for too long a time, and so on as regards the other receivers.

Furthermore, the check valves 46 in the outlet connections 42 between receivers or air bottles 26 and discharge line 40 may be weighted by a spring or equivalent means similar to the manner just described in respect to the check valves 38. In the drawing, the check valve 46 associated with the air bottle on the right, as illustrated in the drawing, has a minimum weighting, the check valve 46 associated with the central air bottle 26 being weighted a certain amount and the check valve 46 associated with the left hand air bottle 26, in the drawing, being weighted more than the valve 46 of the central air bottle. The weighting arrangement just described is illustrated diagrammatically in the drawing by bell cranks. As illustrated, the check valve 46 associated with the left hand air bottle 26 is connected to one end of a bell lever 124, the other end of which is weighted as indicated by a circle having an arrow connected therewith and the legend "30 lbs." associated with the arrow. It will be obvious that by weighting the check valves 46 as just described a preferential discharge of air bottles 26 will occur irrespective of governor controlled discharge valve 44. Therefore, if the check valves 46 in the discharge connections of the air bottles are preferentially weighted as described, the governor controlled valves 44 may often be omitted, if desired.

It is preferred that after a given discharge valve 44 has been thrown into open position by its solenoid 66, it be latched open until the engine has come up to full speed again. For this reason I have illustrated an arrangement including latch members 94 fixed one to the lower end of each of the rods 64 and each having a bevelled end 95. When one of the rods 64 is drawn up by the solenoid winding, end 95 of the corresponding member 94 contacts with a reversely bevelled end 96 of the movable core 98 of a latch solenoid 100. Springs 102 are provided within the windings of solenoids 100 acting normally to thrust the cores 98 outward so that the bevelled ends 96 will lie in the path of the bevelled ends 95 of the parts 94 carried by the rods 64. Therefore when the rods 64 have been drawn up to the uppermost position the members 94 will have pushed by the cores 98 and the cores 98 will have been thrust back beneath the members 94 by the springs 102 so as to latch the rods 94 in their uppermost position, thereby holding the valves 44 wide open. In order to release the members 94 from the latching cores 98 when it is desired to close valves 44, the windings of solenoids 100 may be made part of a circuit. As illustrated, the circuit of solenoids 100 includes the battery 82 and a fixed contact 104. Preferably the closing and opening of the circuit including the solenoids 100 is controlled also by the governor operated contact 74. This circuit for the unlatching solenoids 100 includes the battery 82, lead 84, lead 106, lead 108, individual leads 110, intermediate lead 108 and the windings of the individual solenoids 100, individual leads 112 from the other ends of the windings of the solenoids 100, lead 114, lead 116 connected to the contact 104, movable contact 74, fixed arcuate contact 76 and lead 78 and switch 80 running to the other side of battery 82. It will be seen that when the engine is running at full speed, the circuit solenoids 100 will be closed by the governor operated contact 74 so as to unlatch such of the rods 64 as may be in their uppermost positions thereby permitting the automatic closing of the discharge valves 44. It will be seen that if all the valves 44 are open when the circuit is closed through the contact 104, all the valves 44 will be closed at the same time. It will be understood that other arrangements for automatically holding open one or more of the valves 44 for a time after the valve or valves have been first operated may be substituted for that illustrated and just described. However, it is desirable that some means be used for holding open the discharge valves until the speed has been restored to a certain value. Otherwise the valve 44 which was the first to open at a drop in speed would automatically close when the contact 74 had moved off the first contact 70, even if the speed continued to drop and it were desirable that the full capacity of the storage reservoirs 26 should be in use. It will be evident that rods 64 may be unlatched by hand when desired.

It will be observed that, if the engine is shut down, the contact 74 will pass over all the fixed contacts 70 and all the valves 44 might thereby be opened, putting the piping under continuous high pressure. In order to prevent this, it is preferred that the switch 80 be opened so as to throw the solenoids 66 out of commission when it is intended to shut down the engine.

In starting up the engine, the governor 92 being stationary, contact 74 will, in general, not be in contact with any of the contacts 70. However, in order to use the air stored in one or more of the reservoirs 26 for starting the engine, it is necessary only to turn one or more of the levers 58 by hand so as to open the corresponding valve or valves 44. If desired, the lever 58 may be turned by hand until it is latched open by the members 94 and 98 as previously described, whereupon the switch 80 may be closed and, upon the starting of the engine, the remainder of the operation will be automatic.

It will be understood that while I have illustrated and described herein a particular embodiment of my invention, I do not limit myself to details of the present disclosure, it being the intention to claim all novelty herein disclosed as broadly as the state of the art permits.

Having thus described my invention, what is claimed as new is:

1. The combination in a power plant of a plurality of storage reservoirs, a common discharge line for said reservoirs, check valves between said reservoirs and said line and arranged to prevent back flow from the line to the reservoirs, discharge valves between said reservoirs and said line arranged in series with said check valves, and means for opening said discharge valves one after another.

2. The combination in a power plant of a plurality of storage reservoirs, a common discharge line from said reservoirs, discharge valves between said reservoirs and said line, and means for opening said discharge valves one after another.

3. The combination in a power plant of a plurality of reservoirs, check valves between said reservoirs, a common discharge line for said reservoirs, discharge valves between said reservoirs and said line, and means for opening said discharge valves one after another, said means being adapted also for manual operation.

4. The combination in a power plant of a plurality of storage reservoirs, a common discharge line from said reservoirs, discharge valves between said reservoirs and said line, means for opening said discharge valves one after another, means for latching said valves in open position, and means for releasing said latches.

5. The combination in a power plant, of a plurality of storage reservoirs, a common discharge line from said reservoirs, discharge valves between said reservoirs and said line, check valves between said reservoirs and said line and in series with said discharge valves, said check valves being arranged to prevent back flow from said line to said reservoirs, means for opening said discharge valves one after another, latches for holding said valves in open position, and means for releasing said latches.

6. The combination in a power plant of a plurality of storage reservoirs, a common discharge line from said reservoirs, discharge valves between said reservoirs and said line, means for opening said discharge valves one after another, means for latching said valves in open position, and means for releasing said latches simultaneously.

7. The combination in a power plant of a plurality of storage reservoirs, a common discharge line from said reservoirs, discharge valves between said reservoirs and said line, a speed governor, and means controlled by said governor for operating said discharge valves one after another.

8. The combination in a power plant of a plurality of storage reservoirs, means for charging said reservoirs with oxygen containing gaseous fluid, said means being constructed and arranged to charge said reservoirs successively, and means for discharging said reservoirs successively.

9. The combination in a power plant of a plurality of storage reservoirs, means for charging said reservoirs with oxygen containing gaseous fluid, individual outlet connections for said reservoirs, a common discharge line connected to said outlet connections, and preferentially operable valves connected in said outlet connections.

In testimony whereof I affix my signature.

WINDER E. GOLDSBOROUGH.